United States Patent
Leymann et al.

(10) Patent No.: US 6,308,224 B1
(45) Date of Patent: Oct. 23, 2001

(54) METHOD OF GENERATING AN IMPLEMENTATION OF A WORKFLOW PROCESS MODEL IN AN OBJECT ENVIRONMENT

(75) Inventors: Frank Leymann, Aidlingen; Dieter Roller, Schönaich, both of (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/825,375

(22) Filed: Mar. 28, 1997

(30) Foreign Application Priority Data

Mar. 29, 1996 (EP) .................................................. 96105010

(51) Int. Cl.[7] ........................................................ G06F 15/16
(52) U.S. Cl. .......................... 709/310; 709/318; 709/202
(58) Field of Search ................................. 707/1; 395/701, 395/200.32; 709/310, 318, 331, 202

(56) References Cited

U.S. PATENT DOCUMENTS

| | | | | |
|---|---|---|---|---|
| 4,503,499 | * | 3/1985 | Mason et al. | 709/101 |
| 5,535,322 | * | 7/1996 | Hecht | 705/1 |
| 5,649,185 | | 7/1997 | Antognini et al. | |
| 5,734,837 | * | 3/1998 | Flores et al. | 705/7 |
| 5,745,687 | * | 4/1998 | Randell | 709/201 |
| 5,799,297 | * | 8/1998 | Goodridge et al. | 707/1 |
| 5,848,393 | * | 12/1998 | Goodridge et al. | 705/8 |

FOREIGN PATENT DOCUMENTS 9503345    8/1995  (WO) .

OTHER PUBLICATIONS

Schael et al; Workflow Management systems for Financial Services, COOCS '93, ACM, pp. 142–153, 11/93.*
Workflow management Coalition, "The Workflow Reference Model" Jan. 19, 1995.*

F. Leymann: "A META Model to Support the Modelling and Execution of Processes", Proceedings of the 11th European Meeting on Cybernetics and System Research EMCR92, Vienna, Austria, Apr. 21–24, 1992, World Scientific 1992, pp. 287–294.

F. Leymann and D. Roller: "Business Process Management with FlowMark", digest of papers, Cat. No. 94CH3414–0, Spring COMPCON 94, 1994, pp. 230–234.

F. Leymann and W. Altenhuber: Managing business processes as an information resource, IBM Systems Journal, vol. 32(2), 1994.

D.J. Spoon: "Project Managment Environment", IBM Technical Disclosure Bulletin, vol. 32, No. 9A, Feb. 1990, pp. 250–254.

(List continued on next page.)

Primary Examiner—Zarni Maung
(74) Attorney, Agent, or Firm—Sughrue, Mion, Zinn, Macpeak & Seas, PLLC

(57) ABSTRACT

A method of extending the specifications of a process model within a workflow process environment is disclosed. The process model defines a process activity managed and executed by at least one computer system. The method of extending links the process model with an object environment within which the process activity is to be implemented. This link is realized by a step of relating the process model to at least one object class and one object method residing within the object environment and implementing a process activity. The method of extending also relates the fields of the input and output containers with the input and output parameters of the related object method. Furthermore the method of extending relates and maps exceptions which might be signaled by the related object method within the object environment to return code fields of the process model. In conjunction with the method of extending the specifications of a process model there is also disclosed a computerized method for automatically generating an implementation of a process model managed and executed by at least one computer system.

36 Claims, 11 Drawing Sheets

OTHER PUBLICATIONS

R.T. Marshak: "IBM's Flowmark, Object Oriented Workflow for Mission Critical Applications", Workgroup Computing Report (USA), Vo. 17, No. 5, 1994, pp. 3–13.

IBM FlowMark for OS/2, document No. GH19–8215–01, IBM Corporation, 1994.

H.A. Inniss and J.H. Sheridan: "Workflow Management Based on an Object Oriented Paradigm", IBM Technical Disclosure Bulletin, vol. 37, No. 3, Mar. 1994, p. 185.

\* cited by examiner

```
SOMCLASS 'Account'
   CLASSNAME 'account'
```

FIG. 1

```
PROGRAM_ACTIVITY 'WithdrawAccount'
      ( 'Account', 'Default Data Structure')
      SOMCLASS 'Account'
      METHOD 'withdraw'
END   'WithdrawAccount'
```

FIG. 2

```
SOMCLASS 'Account'

INPUTMAPPING
      DATASTRUCTURE 'Account'
         MAP 'accountNr'  TO 'account'
```

FIG. 3

```
SOMCLASS 'Account'

USEREXCEPTION
      MAP 'badCall'  FROM 'errorCode'
```

FIG. 4

```
SOMCLASS 'Account'

USEREXCEPTION
      MAP 'invalidAccount' TO '30'
```

FIG. 5

```
char*  SOMaccountwithdrawaccount ;
```

FIG. 6

```
badCall*  SOMaccountbadCall ;
```

FIG. 7

```
SOMaccountwithdrawaccount =
    WithdrawAccountInaccountNr->createValue {} ;
```

FIG. 9

```
account*  SOMaccountGlobalAccount = new account ;
```

FIG. 10

```
SOMaccountGlobalObject->withdraw(ev,
                                 SOMaccountwithdrawaccount,
                                 SOMaccountwithdrawamount) ;
```

FIG. 11

```
switch(ev->_major)
{
   case SYSTEM_EXCEPTION :
       // System Exception Processing
       break ;
   case USER_EXCEPTION :
       // User Exception Processing
       break ;
   case NO_EXCEPTION :
       // No Exception
       break ;
}
```

FIG. 12

```
case SYSTEM_EXCEPTION :
       WithdrawAccountOut_RC->putValue(SOMSystemExceptionRC);
       somExceptionFree(ev) ;
       break ;
```

FIG. 13

```
if (strcmp(SOMExcpId,ex_account_badCall) == 0)
   {
      SOMaccountbadCall = (badCall*)
      somExceptionValue(ev) ;
      WithdrawAccountOut_RC->putValue
      (SOMaccountbadCall->errorCode) ;
      somExceptionFree(ev) ;
      break ;
   }
```

FIG. 14

```
if (strcmp(SOMExcpId,ex_account_invalidAccount) == 0
   {
      WithdrawAccountOut_RC->putValue(30) ;
      somExceptionFree(ev) ;
      break ;
   }
```

FIG. 15

```
if  (strcmp(SOMExcpId,ex_account_insufficientFunds) == 0
    {
       WithdrawAccountOut_RC->putValue(SOMUserExceptionRC) ;
       somExceptionFree(ev) ;
       break ;
    }
```

FIG. 16

```
case NO_EXCEPTION :
    WithdrawAccountOut_RC->putValue(SOMNoExceptionRC) ;
    break ;
```

FIG. 17

```
/****************************************************************
*DATA-STRUCTURES
****************************************************************/
STRUCTURE 'Account'
     'accountNr':    STRING;
     'amount':       LONG;
END  'Account'

STRUCTURE  'MoneyTransfer'
    'accountFrom':        STRING;
    'accountTo':          STRING;
    'amountToTransfer':   LONG;
END 'MoneyTransfer'

STRUCTURE  'Default Data Structure'
END 'Default Data Structure'

/****************************************************************
* SOM CLASSES
****************************************************************/
SOMCLASS 'Account'
     CLASSNAME  'account'
     INPUTMAPPING DATASTRUCTURE  'Account'
        MAP 'accountNr' TO 'account'
     USEREXCEPTION
        MAP 'badCall' FROM 'errorCode'
        MAP 'invalidAccount' TO '30'
END 'Account'

/****************************************************************
*
* PROCESSES
*
****************************************************************/

/****************************************************************
* Description of Process FMSOM
****************************************************************/
PROCESS 'FMSOM' ( 'MoneyTransfer', 'Default Data Structure' )

PROGRAM_ACTIVITY  'DepositAccount'
       ( 'Account', 'Default Data Structure')
       SOMCLASS 'Account'
       METHOD 'deposit'
   END 'DepositAccount'

PROGRAM_ACTIVITY 'PrintErrorStatement'
       ( 'Account', 'Default Data Structure' )
       SOMCLASS 'Account'
       METHOD 'printErrorStatement'
   END 'PrintErrorStatement'

PROGRAM_ACTIVITY 'PrintStmtAccountFrom'
       ( 'Account', 'Default Data Structure' )
       SOMCLASS 'Account'
       METHOD 'printStatement'
   END 'PrintStmtAccountFrom'
```

FIG. 19A

```
PROGRAM_ACTIVITY 'PrintStmtAccountTo'
    ( 'Account', 'Default Data Structure' )
    SOMCLASS 'Account'
    METHOD 'printStatement'
END 'PrintStmtAccountTo'

PROGRAM_ACTIVITY 'WithdrawAccount'
    ( 'Account', 'Default Data Structure' )
    SOMCLASS 'Account'
    METHOD 'withdraw'
END 'WithdrawAccount'

CONTROL FROM 'WithdrawAccount'      TO 'DepositAccount'
    OTHERWISE
CONTROL FROM 'DepositAccount'       TO 'PrintStmtAccountFrom'
CONTROL FROM 'WithdrawAccount'      TO 'PrintErrorStatement'
    WHEN '_RC > 0'
CONTROL FROM 'PrintStmtAccountFrom' TO 'PrintStmtAccountTo'

DATA FROM SOURCE    TO 'WithdrawAccount'
    MAP 'amountToTransfer'    TO 'amount'
    MAP 'accountFrom'         TO 'account'

DATA FROM SOURCE    TO 'DepositAccount'
    MAP 'amountToTransfer'    TO 'amount'
    MAP 'accountTo'           TO 'account'

DATA FROM SOURCE    TO 'PrintStmtAccountTo'
    MAP 'accountTo'           TO 'account'

DATA FROM SOURCE TO 'PrintStmtAccountFrom'
    MAP 'accountFrom'         TO 'account'

DATA FROM SOURCE TO 'PrintErrorStatement'
    MAP 'accountFrom'         TO 'account'

END 'FMSOM'
```

FIG. 19B

```
include <somobj.idl> interface account:SOMObject

{ exception badCall
   {
      long errorIndicator ;
      long errorCode ;
   } ;

exception insufficientFunds
   {
   } ;

exception invalidAccount
   {
   } ;

void deposit (in string account,
                 in long amount) raises (badCall,
                                           invalidAccount) ;
   void withdraw (in string account,
                  in long amount,) raises (badCall,
                                            insufficientFunds,
                                            invalidAccount) ;
   void printStatement (in string account) raises (badCall) ;
   void printErrorStatement (in string account) raises(badCall) ;
   void create (in string account) raises (badCall) ;
   void remove (in string account) raises (badCall) ;

#ifdef_SOMIDL_
   implementation
   { string account ;
      long amount ;

releaseorder: deposit,
                    withdraw,
                    printStatement,
                    printErrorStatement ,
                    create ,
                    remove ;

} ;
   #endif
} ;
```

FIG. 20

```
class dataItemString : public dataItem {
   char*      value ;
public :

void       copyValue (dataItemString* sourceContItem) ;
   void       putValue (char* dataItemValue) ;
   char*      getValue () ;
   int        testForTrue (int compOperator, char* compValue) ;
   char*      createValue () ;
} ;

char* dataItemString::createValue ()
{
   char* returnValue ;
   if (valueSet  == OFF) {
      returnValue =  NULL ;
   } else {
      returnValue = new char [strlen(value)+1] ;
      strcpy(returnValue,value) ;
   }
   return (returnValue) ;
} class dataItemLong : public dataItem {
   long       value ;

public :

void       copyValue (dataItemLong* sourceContItem);
   void       putValue (long dataItemValue) ;
   void       putValue (short dataItemValue) ;
   void       putValue (char* dataItemValue) ;
   long       getValue () ;
   int        testForTrue (int compOperator, long int compValue) ;
   long       createValue () ;
  } ;

long dataItemLong::createValue ()
  {
     long returnValue;
     if (valueSet) {
        returnValue = value ;
     } else {
        returnValue = 0 ;
     }
     return (returnValue) ;
  } class dataItemFloat : public dataItem {
     float      value ;
```

FIG. 21A

```
01 #include <os2.h>
02 #include <stdio.h>
03 #include <string.h>
04 #include <stdlib.h>

05 #include "account.xh"

06 #include "activity.hpp"
07 #include "dataItem.hpp"

08 int main (int argc, char* argv[])
09 {

10     int exitCondition ;

11     Environment* ev = somGetGlobalEnvironment () ;
12     char* SOMExcpId ;
13     long SOMNoExceptionRC = 0 ;
14     long SOMSystemExceptionRC = -100 ;
15     long SOMUserExceptionRC = 50 ;

16     char* SOMaccountdepositaccount ;
17     long SOMaccountdepositamount ;
18     char* SOMaccountwithdrawaccount ;
19     long SOMaccountwithdrawamount ;
20     char* SOMaccountprintStatementaccount ;
21     char* SOMaccountprintErrorStatementaccount ;

22     badCall* SOMaccountbadCall ;

23 /*********************************************
24  *                WithdrawAccount
25  *********************************************/

26     dataItemLong* WithdrawAccountOut_RC = new dataItemLong ;
27     WithdrawAccount->incrActualNrCCIn() ;

28     WithdrawAccount->setActivityExecuted() ;

29     dataItemString* WithdrawAccountInaccountNr = new dataItemString ;
30     dataItemLong* WithdrawAccountInamount = new dataItemLong ;

31     WithdrawAccountInamount->copyValue(FMSOMInamountToTransfer) ;
32     WithdrawAccountInaccountNr->copyValue(FMSOMInaccountFrom) ;

33     SOMaccountwithdrawaccount =
       WithdrawAccountInaccountNr->createValue () ;
34     SOMaccountwithdrawamount =
       WithdrawAccountInamount->createValue () ;

35     account* SOMaccountGlobalObject = new account ;

36     SOMaccountGlobalObject->withdraw(ev,
                       SOMaccountwithdrawaccount,
                       SOMaccountwithdrawamount) ;
```

FIG. 22A

```
37  switch(ev->_major)
    {
38    case SYSTEM_EXCEPTION :
39       WithdrawAccountOut_RC->putValue(SOMSystemExceptionRC) ;
40       somExceptionFree(ev) ;
41       break ;
42    case USER_EXCEPTION :
43       SOMExcpId = somExceptionId (ev) ;
44       if (strcmp(SOMExcpId,ex_account_badCall) == 0)
         {
45          SOMaccountbadCall = (badCall*)
            somExceptionValue(ev) ;
46          WithdrawAccountOut_RC->putValue
            (SOMaccountbadCall->errorCode) ;
47          somExceptionFree(ev) ;
48          break ;
         }
50       if (strcmp(SOMExcpId,ex_account_insufficientFunds) == 0
         {
51          WithdrawAccountOut_RC->putValue(SOMUserExceptionRC) ;
52          somExceptionFree(ev) ;
53          break ;
         }
54       if (strcmp(SOMExcpId,ex_account_invalidAccount) == 0
         {
55          WithdrawAccountOut_RC->putValue(30) ;
56          somExceptionFree(ev) ;
57          break ;
         }
58    case NO_EXCEPTION :
59       WithdrawAccountOut_RC->putValue(SOMNoExceptionRC) ;
60       break ;
      }

61    delete SOMaccountwithdrawaccount ;
62    SOMaccountwithdrawamount = 0 ;

63    delete WithdrawAccountInaccountNr ;
64    delete WithdrawAccountInamount ;

65    otherwise = ON ;
66    if (WithdrawAccountOut_RC->testForTrue(2,0)) {
67       otherwise = OFF ;
68       PrintErrorStatement->incrActualNrCCIn();
      }
69    if (otherwise == ON) {
70       DepositAccount->incrActualNrCCIn() ;
      }
71 /*********************************************
72  *           Other program activities
73  *********************************************/

METHOD OF GENERATING AN IMPLEMENTATION OF A WORKFLOW PROCESS MODEL IN AN OBJECT ENVIRONMENT

BACKGROUND OF THE INVENTION

1. Field of the Invention

The present invention relates to the technical field of process management of a workflow environment on computer systems. More specifically, the present invention relates to an extension of a workflow environment and combining it with an object environment, both environments residing and being executable on a computer system.

2. Related Art

The process of designing, developing and manufacturing a new product and the process of changing or adapting an existing product presents many challenges to product managers and engineers to bring the product to market for the least cost and within schedule while maintaining or even increasing product quality. Many companies are realizing that the conventional product design process is not satisfactory to meet these needs. They require early involvement of manufacturing engineering, cost engineering, logistic planning, procurement, manufacturing, service and support with the design effort. Furthermore, they require planning and control of product data through design, release, and manufacturing.

The correct and efficient execution of business processes within a company, e.g. development or production processes, is of enormous importance for a company and has significant influence on company's overall success in the market place. Therefore, those processes have to be regarded similarly as technology processes and have to be tested, optimized and monitored. The management of such processes is usually performed and supported by a computer based process or workflow management system.

In D. J. Spoon: "Project Management Environment", IBM Technical Disclosure Bulletin, Vol. 32, No. 9A, February 1990, pages 250 to 254, a process management environment is described including an operating environment, data elements, and application functions and processes.

In R. T. Marshak: "IBM's FLOWMARK, Object Oriented Workflow for Mission Critical Applications", Workgroup Computing Report (USA), Vol. 17, No. 5, 1994, page 3 to 13, the object character of a product of International Business Machines Corporation called IBM FLOWMARK as a client/server product built on a true object model that is targeted for mission critical production process application development and deployment is described.

In H. A. Inniss and J. H. Sheridan: "Workflow Management Based on an Object Oriented Paradigm", IBM Technical Disclosure Bulletin, Vol. 37, No. 3, March 1994, page 185, other aspects of object oriented modeling on customization and changes are described.

In F. Leymann and D. Roller: "Business Process Management with FLOWMARK", Digest of papers, Cat. No. 94CH3414-0, Spring COMPCON 94, 1994, pages 230 to 234, the state of the art computer process management tool IBM FLOWMARK is described. The meta model of IBM FLOWMARK is presented as well as the implementation of IBM FLOWMARK. The possibilities of IBM FLOW-MARK for modeling of business processes as well as their execution are discussed. The product IBM FLOWMARK is available for different computer platforms and documentation for IBM FLOWMARK is available from International Business Machines Corporation.

In F. Leymann: "A meta model to support the modeling and execution of processes", Proceedings of the 11th European Meeting on Cybernetics and System Research EMCR92, Vienna, Austria, Apr. 21 to 24, 1992, World Scientific 1992, pages 287 to 294, a meta model for controlling business processes is presented and discussed in detail.

The "IBM FLOWMARK for OS/2", document number GH 19-8215-01, IBM Corporation, 1994, available from International Business Machines Corporation and herein incorporated by reference, represents a typical modem, sophisticated, and powerful workflow management system. It supports the modeling of business processes as a network of activities. This network of activities, the process model, is constructed as a directed, acyclic, weighted, colored graph. The nodes of the graph represent the activities which are performed. The edges of the graph, the control connectors, describe the potential sequence of execution of the activities. Definition of the process graph is via the IBM FLOWMARK Definition Language (FDL) or the built-in graphical editor. The runtime component of the workflow manager interprets the process graph and distributes the execution of activities to the right person at the right place, e.g., by assigning tasks to a work list according to the respective person, wherein the work list is stored as digital data within the workflow or process management computer system.

In F. Leymann and W. Altenhuber: "Managing business processes as an information resource", IBM Systems Journal, Vol. 32(2), 1994, the mathematical theory underlying the IBM FLOWMARK product is described.

In D. Roller: "Verifikation von Workflows in IBM FLOWMARK", in J. Becker und G. Vossen (Hrsg.): "Geschaeftsprozessmodellierung und Workflows", International Thompson Publishing, 1995, the requirement and possibility of the verification of workflows is described. Furthermore, the feature of graphical animation for verification of the process logic is presented as it is implemented within the IBM FLOWMARK product.

For implementing a computer based process management system, firstly the business processes have to be analyzed and, as the result of this analysis, a process model has to be constructed as a network of activities corresponding to the business process. In the IBM FLOWMARK product, the process models are not transformed into an executable. At run time, an instance of the process is created from the process model, called a process instance. This process instance is then interpreted dynamically by the IBM FLOW-MARK product.

A previous patent application of the same applicant, application number PCT/EP 95/03345, titled "Method and Computer System for Generating Process Management Computer Programs from Process Models", teaches how a process graph can be transformed into a C++ program, if the process is executed by one user at one time at one place consecutively.

The technological area of object environments has become known, for instance, by the Common Object Request Broker (CORBA) standard of the Object Management Group (OMG). Detailed information on CORBA can be found in "The Common Object Request Broker: Architecture and Specifications", OMG Document Number 91.12.1, Revision 1.1. CORBA is part of a larger object architecture outlined in OMG's Object Management Architecture (OMA) Guide. Details on the OMA may be found in the Object Management Architecture (OMA) Guide Revision 2.0, Second Edition, Sep. 1, 1992, OMG TC Document 92.11.1. With respect to CORBA various implementations and extensions of this standard are commercially available such as IBM's System Object Model (SOM). Of course other object environments are or might be part of the state of the art even though not conforming with the CORBA standard.

SUMMARY OF THE INVENTION

The invention is based on the objective to provide a new kind of extension of a process model within a workflow environment triggering an automatic and computerized generation of an implementation of the process model within an object environment and the implementation of the process model being executable on a computer system.

According to one embodiment of the invention, there is provided a method of extending the specifications of a process model within a workflow process environment, wherein the process model defines a process activity managed and executed by at least one computer system. The method of extending links the process model with an object environment within which the process activity is to be implemented. This link is realized by a step of relating the process activity of the process model to at least one object class and one object method residing within the object environment and implementing a process activity.

Based on these extensions of the specifications of a process model the gap between two different and separate environments, a workflow process environment on one side and an object environment on the other side, has been bridged. According to the invention, a seamless transition now is feasible.

As a further advantage the extended specifications represent a unified modeling environment of process models independent from the actual implementations of the process model. Thus the extended specifications allow one to focus on the most important task, the specification of workflow process models, independent from its actual implementation which, according to the invention, might be realized within the object environment.

Many object environments, like IBM's SOM object environment being of importance for the preferred embodiment of the invention, allow one to implement object structures in almost any implementation language (C++, C, COBOL, etc.). Therefore the above extension introduces a complete implementation independence for a process model. Moreover, object structures and object methods already implemented in an object environment, typically the case for many business objects, can now be directly reused as implementations of process activities.

According to a further embodiment of the disclosed invention, the method of extending also relates the fields of the input and output containers with the input and output parameters of the related object method.

This teaching bridges two different concepts: the container concept on the workflow process environment side, storing a collection of the present input/output data fields of an active process, and the method parameter concept of the object environment side, which is the corresponding approach to store input/output information for active object methods within the object environment.

According to a further embodiment of the disclosed invention, the method of extending relates and maps exceptions which might be signaled by the related object method within the object environment to return code fields of the process model.

The concept of exceptions is a unique approach of object environments not used within a workflow process environment. By introducing above teaching the invention realizes a seamless integration of the exception concept within the workflow process environment.

According to yet another embodiment, the invention also teaches a computerized method for automatically generating an implementation of a process model managed and executed by at least one computer system. The method of generating uses the specifications of a process model extended by specifications relating the process model to object structures outside the workflow process environment and generates an implementation of the process model as object structures residing within an object environment. The generated implementation of the process model encompasses an implementation component residing within the process environment and an implementation component residing within the object environment. The method of generating comprises an analysis step of the specifications of the process model. Based on this analysis the method generates the related object classes and the related object methods as implementations of the process activities, if these related object classes and related object methods do not exist yet. For calling the generated and implementing object method from within the workflow process environment in another step an invocation context is generated.

It is advantageous that all the specifications available within the workflow process environment can be exploited and can suffice for automatically generating the implementation structures located outside the process environment. Human intervention is no longer required to establish the object structures.

Furthermore, due to the automation of the method, no further knowledge on the peculiarities of the object environment is required to establish the process models. As a consequence, the process modeling within the workflow process environment represents a unified modeling environment independent from the actual implementations of the process model. Thus users of the invention may focus on the most important task, the specification of workflow process models, independent from its actual implementation which, according the invention, may be generated automatically as object structures within the object environment. All the tools available within the workflow process environment supporting the definition of process models can now be used to generate also the implementing object structures.

As already mentioned, many object environments, like IBM's SOM object environment, allow one to implement object structures in almost any implementation language (C++, C, COBOL, etc.). Even existing object structures and object methods already implemented in an object environment can now be directly reused as implementations of process activities.

It is further advantageous that the generated object structures are executable programs so that processing of a process model is performed via the execution of a program rather than the dynamic interpretation of the process model by the workflow process environment. This allows the workflow process environment to operate with significantly less resource consumption, i.e., with less computing and memory resources, at even higher speed.

As a further advantage the invention is generating not only the implementing object structures in the object environment but also an invocation context to invoke the related object methods from within the workflow process environment.

According to a further embodiment of the disclosed invention the method generates input and output variables for each input and output container field related to input and/or output parameters of the related object methods.

It is very time consuming to create these variables not supported by an automatic process. Also this task typically is very error prone if not accomplished through automation.

According to a further embodiment of the disclosed invention the method generates within the invocation context also processing sequences for copying values of fields of the input containers to the generated input variables. The invocation context is equipped to instantiate related object classes and to call related object methods for execution of the implementing process activity. The invocation context is further equipped to analyze and handle potential exceptions signaled in the object environment and communicate them to the workflow process environment. Finally the generated invocation context will take care to remove the generated input and output variables.

To accomplish these task automatically is of major importance as creation of this invocation context requires the knowledge of both environments, the workflow environment as well as the object environment. If, as in the current case, all these steps can be performed automatically, one achieves a seamless link between a workflow process environment and an object environment. Moreover, in this case it is a further advantage that the workflow process model represents a unified modeling approach for process models independent from the actual implementations of the to process model.

The invention may be practiced in a method, a computer system, or in a program product. It will be appreciated that the term, "program product" means a computer usable medium that bears computer useable instructions. The medium may be provided in various forms, including diskette, compact disk, tape, chips, wireline transmission, satellite transmission, Internet downloading, and the like. The computer useable instructions may also be in various forms, such as compiled or non-compiled code. It will be appreciated that the term, "computer system" includes single and multi-processor environments, client-server arrangements, distributed and local processing, network and stand-alone systems, and others. A computer system may optionally even include, as a communications means, the Internet or other networks. One acquainted with this field will appreciate that "program product" and "computer system" are meant in a broad sense.

BRIEF DESCRIPTION OF THE DRAWINGS

FIG. 1 is a diagram illustrating the specification to relate a registered object class to a class name based on an example FIG. 2 is a diagram illustrating the specification to relate an object method implementing a process activity to a process activity based on an example FIG. 3 illustrates the specifications allowing to map the fields of the input and output containers with the input, output and inout method parameters of the registered object methods FIG. 4 illustrates a certain form of relating a variable storing an exception of significance within the object environment to the return code being of significance within the process environment FIG. 5 illustrates a certain form of relating a specific value representing an exception of significance within the object environment to the return code being of significance within the process environment FIG. 6 depicts an input or output variable created during the generation process assuming that the analysis step detected a specification relating fields of input or output containers with input or output parameters of object methods FIG. 7 depicts a variable created during the generation process referring to an exception assuming that the analysis step detected a mapping specification for exceptions within the object environment onto a return code field within the process environment FIG. 8 summarizes the method of generating an implementation of a process model within the object environment accessible from within a process environment FIG. 9 depicts a generated implementation sequence for setting up an input variable of an object method FIG. 10 depicts a generated implementation sequence for instantiating a related object class FIG. 11 depicts a generated implementation sequence for invocation of a related object method FIG. 12 depicts a generated general implementation sequence for checking if an invoked object method raised an exception FIG. 13 depicts a generated implementation sequence for checking if an invoked object method raised a system exception FIG. 14 depicts a generated implementation sequence for checking if an invoked object method raised an exception with a specific attention to the analysis of the nature of the exception occurred within the object environment FIG. 15 depicts a generated implementation sequence if the checking of a potential exception includes the mapping of exception values FIG. 16 depicts a generated implementation sequence for handling an exception raised by an object method if the exception is not identifiable and a default system exception return code is used instead FIG. 17 depicts a generated implementation sequence for checking if an invoked object method raised an exception if no exception could be detected FIG. 20 shows the generated SOM class structures in their IDL expression, if not already available through other procedures, as an implementation of that part of the process model residing in the SOM object environment generated according to the teaching of the invention FIG. 21 reflects the class extensions of the dataItem class, which support the process of copying the values of fields of the containers to the parameters of the object methods FIG. 22 illustrates the code generated according to the teaching of the invention which calls from within the FLOWMARK process environment a related object method of a related class implementing the activity of the example in the SOM object environment. This code sequence assembles an invocation context for the invocation of the related object method.

DESCRIPTION OF THE PREFERRED EMBODIMENT

Introduction

Figure 8:
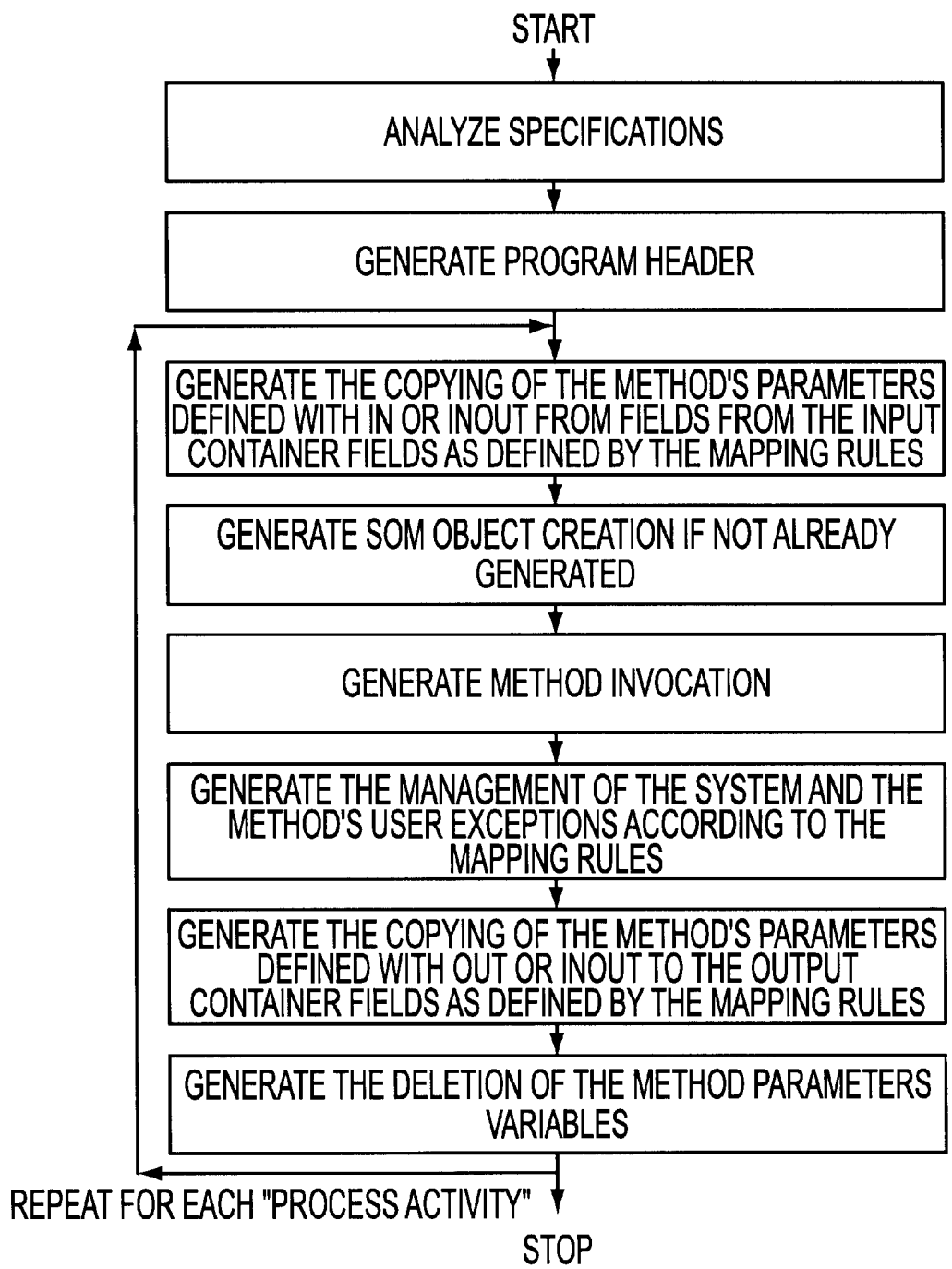

The following description of the invention is based on the above-identified IBM FLOWMARK workflow manager. Without any limitation of the scope of the invention any other workflow manager may be used instead for an implementation of the invention.

Similarly the preferred embodiment of the invention is targeted towards IBM's System Object Model (SOM) as object environment for which the object implementations are generated. Again this choice of an object environment does not limit the scope of the invention. The disclosed methods are applicable to any other implementation of OMG's CORBA standard and any other potential object environment.

In the technical field of object orientation the term "object" is sometimes used in a wider sense, designating actually an object class, and sometimes it is used in a narrow sense, designating an instance of a class of objects. Also the term "object" might be used actually designating an instance of a class object. Depending on the context the term is used it will be obvious to which of the various meanings the term refers.

The presently preferred embodiment of invention generates object structures within the object environment as C++ programs. The teaching of the invention is of general nature and therefore the generation process may create these object structures in any other suitable programming language.

Concepts

The IBM FLOWMARK family implements a workflow manager. It supports the modeling of business processes as a network of activities. This network of activities is constructed as a directed, acyclic, weighted, colored graph. The nodes of the graph represent the activities which are performed. The edges of the graph describe the potential sequence of execution of the activities. Definition of the process graph is via the IBM FLOWMARK Definition Language (FDL) or the built-in graphical editor. The runtime component of the workflow manager interprets the process graph and distributes the execution of activities to the right person at the right place.

IBM FLOWMARK implements the construct of a program activity. The program activity references a program object, which provides the information about the program, such as invocation mechanism, program executable name, input and output data structures, and execution environment. This information is used to invoke the program associated with the program activity. Thus the program object is the link between the definition of the program activity, i.e. the process model, and the executable program implementing this activity.

System Object Model (SOM) is IBM's implementation of binary compatible class libraries. SOM is fully described in "IBM SOMObjects Developer Toolkit Users Guide" available from International Business Machines Corporation and herein incorporated by reference. Classes are described via OMG's Interface Definition Language (IDL). From that definition, the SOM compiler generates (1) the appropriate header file for inclusion into a program which uses that class and (2) a template for the implementation of the methods by the method implementer. Optionally the SOM compiler stores all SOM class information in the SOM Interface Repository (SOM IR). SOM provides classes and associated methods to access the SOM Interface Repository.

In many cases, those program activities are expressed as action-object pairs. In a loan application, activities may be expressed as assess risk, reject credit, and accept credit. This lends itself to the interpretation of activities as the invocation of a method on an object.

The described method of the invention teaches how the FLOWMARK process model can be extended to support the invocation of methods against SOM objects as an implementation of a program activity. The fields in the input container are copied to the method's parameter fields, the method is executed, the exceptions returned by the method are translated into the return code construct of the process meta model, and the method's parameter fields are copied into the proper fields of the output container. Thus, the invention allows users to create applications by using IBM FLOWMARK Definition Language to script together methods against business objects implemented as SOM classes.

Process Model Additions

A new registration mechanism for the registration of SOM classes is added to the FLOWMARK Definition Language as a set of additional specifications. This mechanism is modeled after the program registration mechanism as a separate section. Each SOM class is registered via the SOMCLASS keyword. This keyword is followed by the name of the SOM class. This name is used to reference the SOM class from a program activity. The actual name of the SOM class is specified via the CLASSNAME keyword. If not specified, the actual name of the SOM class defaults to the registration name. All class information is obtained by accessing the SOM interface repository. FIG. 1 shows the registration of the account class under the registration name of Account. The class name account is used to access the SOM Interface Repository.

The program activity mechanism of IBM FLOWMARK is extended to support the invocation of methods against SOM objects as an implementation of a program activity. This requires that the following information is added to the PROGRAM ACTIVITY keyword:

the name of the SOM class via the SOMCLASS keyword, the name of the method via the METHOD keyword and the identifier of the object via the OBJECTED keyword.

Certain of these specifications modeling the relationship with an object method as an implementation of an activity are depicted in FIG. 2. In particular, FIG. 2 shows the withdrawal of money from an account. This is performed by invoking the withdraw method on an account object.

The identifier of the object as specified via the OBJECTED keyword identifies the instance of the SOM class on which the method should be invoked. Multiple instances of a particular SOM class can coexist within the process. For each SOM class a global instance is maintained. This global instance is used when no object identifier is specified.

The mappings between the method's parameters and the fields in the input/output container are expressed via a mapping scheme. This mapping scheme defines how the values of the fields of the input container are copied to the method parameters defined as IN or INOUT, and after the execution of the method, how the values of the method parameters defined with INOUT or OUT are copied to the appropriate fields in the output container. The details of the mapping scheme are described below in "Parameter Mapping".

Exceptions are the means by which SOM methods executing in the object environment indicate that the method has detected an error. They are returned via the environment structure which is passed as a parameter in the method. A return code, implemented as the _RC field in the output container, is the means by which programs indicate to IBM FLOWMARK that they have detected an error. A mapping scheme is provided that allows one to map the SOM error mechanism to the IBM FLOWMARK error mechanism, that means to map SOM exceptions to IBM FLOWMARK return codes. Details of the mapping scheme are described below in "Exception Handling".

Parameter Mapping

The rules for mapping input container fields to the method's IN and INOUT parameters and mapping the method's INOUT and OUT parameters to the output container can be specified on the increasing lower levels of the class, the method, and the program activity level. Mappings on a lower level override the mappings on higher levels.

The subsection INPUTMAPPING within the FLOWMARK Definition Language starts the set of rules for mapping input container fields to the method parameters; the subsection OUTPUTAMPPING starts the set of rules for mapping method parameters to output container fields.

The keyword DATASTRUCTURE followed by a string allows one to specify the name of the data structure identified by string which contains the fields for which mapping is specified. The specification of the DATASTRUCTURE keyword is meaningless when specified on the activity level. The actual mapping is specified via the MAP/TO keyword pairs. The MAP keyword is followed by the name of the field in the data structure, followed by the TO keyword, followed by the name of the method parameter. FIG. 3 shows the mapping of the field accountNr in the data structure Account, i.e. in the input container, to the parameter account of the object method. As the specification is on the class level, this mapping is applied to all methods which do have a parameter field with the name of account and the input container of the associated program activity references the named data structure Account.

If no mapping is specified, mapping is by field name. If no match is found, the method parameter is set to NULL for parameters of type STRING and to zero for parameters of type LONG or FLOAT.

Exception Handling

SOM differentiates two type of exceptions: system exceptions and user exceptions. The set of system exceptions is defined by CORBA and can be returned by any method. Detailed information on CORBA can be found in "The Common Object Request Broker: Architecture and Specifications", OMG Document Number 91.12.1, Revision 1.1. User exceptions must be registered with the SOM class. The set of user exceptions which can be returned by a method are specified together with the method.

System Exception

If a system exception is returned, the system exception needs to be mapped to a value to be stored in the _RC field in the output container. The value is generated from a table which can be maintained by the user. The table contains a set of entries, each entry includes a CORBA specified exception and the return code to which the exception should be mapped. If a particular exception is not defined in the table, a user-definable default system exception return code is used. If the user has not specified a value for this system exception return code, a system-defined default system exception return code of −100 is used.

User Exception

If a user exception is returned, the user exception needs to be mapped to a value to be stored in the _RC field in the output container. The mapping rules can be defined on the increasingly lower levels of the class, method, and program activity level. Mapping rules on a lower level override corresponding mapping rules on higher levels.

The subsection USEREXCEPTION in the specifications of the FLOWMARK Definition Language starts the set of mapping rules which are defined using the MAP-(FROM/TO) keyword pair. These specifications embody a relationship between the exceptions potentially occurring during execution of an object method in the object environment and a return code within the process environment. The MAP keyword is followed by a string identifying the user exception, followed by either the TO or the FROM keyword, and terminated by a string, which is either the name of a field defined in the exception or an integer.

The FROM keyword is used to specify that the string defines a field in the exception. The contents of this field is moved to the return code field _RC in the output container. The field must be of type LONG or FLOAT. FIG. 4 shows that the field errorCode is selected as the field from which the value is extracted and stored in the _RC field.

The TO keyword is used to specify that the string contains an integer value. When the exception is raised, the _RC field of the output container is filled with the integer. FIG. 5 shows that 30 should be inserted into the _RC field, if the exception invalidAccount is returned.

If no mapping is defined for a user exception, the exception is searched for fields of type LONG or SHORT. The field is selected according to the following search order:

if only one field of type LONG is defined, this field is selected, if only one field of type SHORT is defined, this field is selected, if multiple fields of type LONG are defined, the first field of type LONG when reading the SOM interface repository is selected, and if multiple fields of type SHORT are defined, the first field of type SHORT when reading the SOM interface repository is selected.

If the exception has no field or no field of type LONG or SHORT has associated with it, a user-defined default user exception return code is assigned to the return code. If the user has not defined a default user exception return code, a system-defined user exception return code of +100 is used.

Program Generation

Based on the additional specifications of the FLOWMARK Definition Language outlined in "Process Model Additions" a program generation approach may be exploited to automatically generate the object structures implementing the specified activities. The specific support of method invocations against SOM objects as an implementation of program activities requires a unique generation process.

Especially during phase 1 of the generation method the new FDL section for registering SOM classes and the new keywords for the PROGRAM_ACTIVITY section has to be recognize by the generation process.

In phase 2 of the generation method the proper code for the support of the SOM objects and the method calls against those objects has to be generated. Furthermore the program header and the program body have to be generated accordingly.

Program Header Generation

For each SOM class, the appropriate include statement for the class header file is created in the form #include "classname.xh".

The dataItem classes, being the class used for the implementation and instantiation of the input and output container, are extended with a new method CreateValue. This new method is used to fill a parameter of the method by copying them from a field in the input container. If the container field has no value, a NULL pointer is assigned to parameters of type STRING and zero to parameters of type LONG and FLOAT.

Program Body Generation

A number of definitions are generated to support SOM including the SOM environment variable, variables to manage the SOM exceptions, and defaults for return codes.

For each parameter in each method, a program variable of the proper type is created. These variables will be filled later with values from input container fields and then passed to the method. After the method call, the values of the parameters are copied to the proper fields of the output container. FIG. 6 shows the definition of the account field of the withdraw method of the account class.

After that, pointers to the SOM exceptions are defined for those SOM exceptions which do have fields. FIG. 7 shows the definition of such a pointer for the badCall exception of the account class.

A completely different piece of code needs to be generated for those program activities which are implemented as method invocations on SOM objects. FIG. 8 shows in a flow the steps to be performed to generate the code for each of those activities. These steps are:

analyze (once for the program) the specifications of the process model, i.e. the FDL, generate (once for the program) the program header, generate the copying of the method's parameters defined with IN or INOUT from fields from the input container fields as defined by the mapping rules, generate SOM object creation if not already generated, generate method invocation, generate the management of the system and the method's user exceptions according to the mapping rules, generate the copying of the method's parameters defined with OUT or INOUT to the output container fields as defined by the mapping rules, and generate the deletion of the method parameters variables.

Method Parameter Filling

The parameters defined as IN or INOUT are filled with the values of the fields in the input container as defined in the mapping rules. Copying is performed by executing the create Value method on the appropriate instances of the input container fields with the proper method parameter as the target of the return values. FIG. 9 shows how the accountNr field in the input container is mapped to the parameter field account of the SOM method. The actions performed by the create Value method of the dataItem class depend on the data type of the parameter. If the parameter is of type FLOAT or LONG, the field value of the container data item is copied to the parameter field; if the parameter is of type STRING, a string field is allocated, the value is copied to that string, and the pointer to the string is returned and stored in the parameter. If no corresponding field for a method parameter can be found in the input container, the parameter is set to zero for FLOAT and LONG fields and to NULL for STRING fields.

Object Creation

If no instance of the SOM class with the defined object identifier has been created previously, the appropriate instance is created. If OBJECTED has not been specified, the global identifier for the SOM class is used. FIG. 10 shows the creation of a SOM object for the class account.

Method Invocation

The invocation of the method is standard SOM offset resolution method invocation. FIG. 11 shows the invocation of the withdraw method against the specified SOM object of the account class.

Exception and Return Code Checking Checking of the method's exceptions starts with checking what type of exception, if any, has occurred. This is done, as shown in FIG. 12, by checking the __major field in the environment structure maintained by SOM.

For managing system exceptions, the piece of code as shown in FIG. 13 is generated. The __RC field is filled with the user-defined default system exception return code. Then the storage allocated by SOM for managing exceptions is freed.

Processing of user exceptions and their mapping to the __RC field depends upon the mapping of the user exception to the return code. FIG. 14 shows the generated code when the mapping is from a field in the exception to the return code. When the exception badCall is returned, the field errorCode of the badCall exception is located and its contents is moved to the __RC field.

If mapping of the exception to the __RC field has been specified as mapping to a constant, the code as shown in FIG. 15 is generated. Whenever the exception invalidAccount is detected, the return code is set to 30.

If no mapping has been specified for the exception and the exception has no fields, the return code will be set to the system wide default value as shown in FIG. 16.

If no exception is found as shown in FIG. 17 the memory allocated by SOM for managing the exception needs only to be freed.

Output Container Filling

After the successful processing, the values of all parameter fields defined with INOUT and OUT are copied to the proper fields in the output container.

The ACCOUNT Example

For illustration of the invention its teaching is demonstrated with the help of an example.

Figure 18:
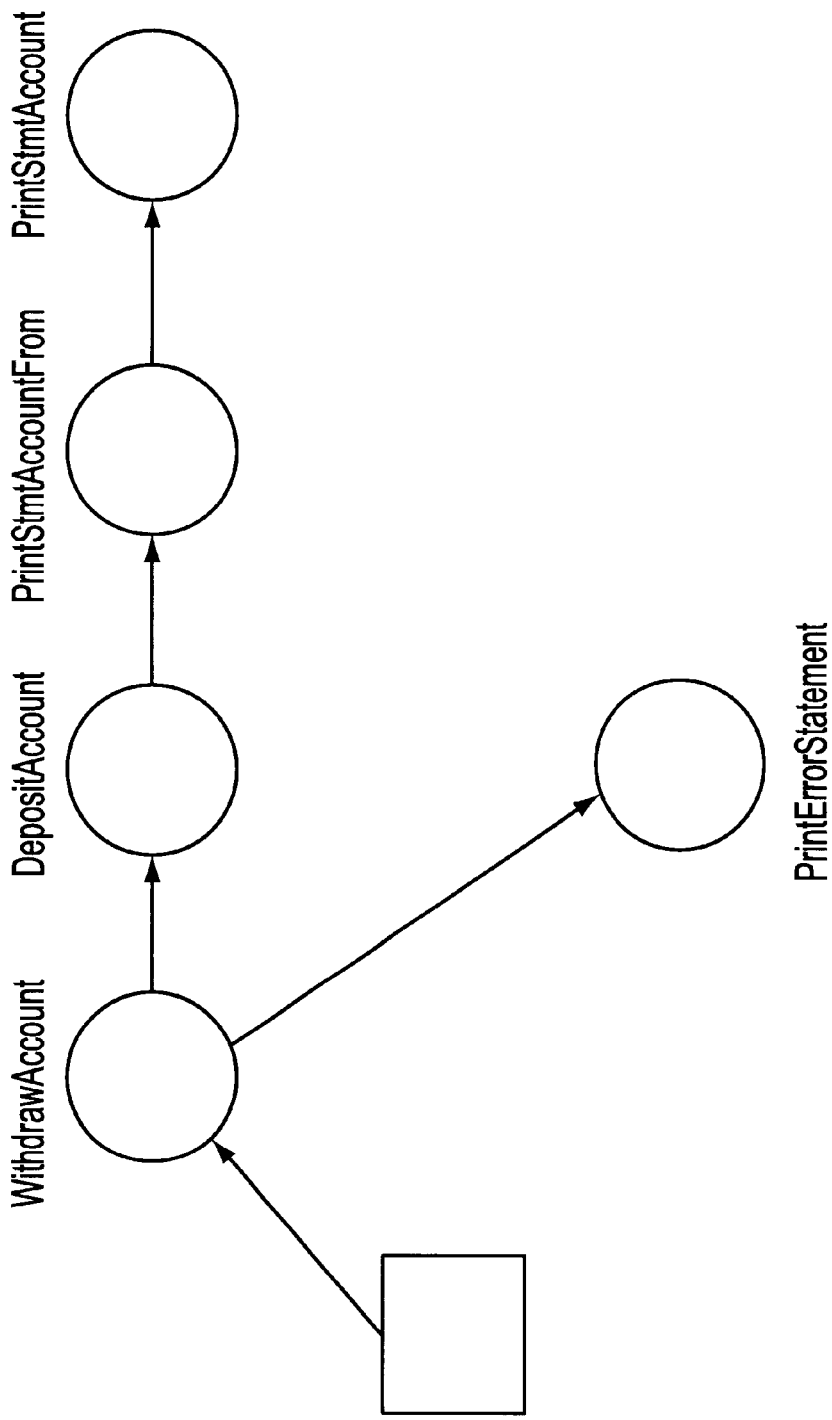
FIG. 18 illustrates a process flow in a simple example related to a withdrawal transaction from a bank account FIG. 19 portrays the definitions of the process model for the ACCOUNT example represented in the FLOWMARK Definition language (FDL) including the specifications generated according to the teaching of the invention and representing the relationship between the process environment and the object environment for the process model

The simple ACCOUNT example illustrates the disclosed method in the context of transferring money from one bank account to another. The process is started by entering data about the account from which the money is withdrawn, the account to which the money is transferred, and the amount of money to be transferred. If the account from which money is to be withdrawn does not contain sufficient funds, an error statement is printed. If the transfer is successful, a statement is printed for both accounts. This process flow is illustrated in FIG. 18.

The example includes the following elements:

the process model for the ACCOUNT example represented in the FLOWMARK Definition language (FDL) including the specifications generated according to the teaching of the invention and representing the relationship between the process environment and the object environment for the process model;

the generated SOM class structures as an implementation of the process model in the SOM object environment generated according the teaching of the invention;

the class extensions of the dataItem class, which support the process of copying the values of fields of the containers to the parameters of the object methods;

the code generated according to the teaching of the invention which calls from within the FLOWMARK process environment a related object method of a related class implementing the activity of the example in the SOM object environment. This code sequence assembles an invocation context for the invocation of the related object method.

Process Definition in FDL

FIG. 19 portrays the definitions of process model for the ACCOUNT example represented in the FLOWMARK Definition language (FDL) including the specifications generated according to the teaching of the invention and representing the relationship between the process environment and the object environment for the process model.

Specific attention should be given to:

the CLASSNAME 'account' statement establishing a relationship to a related object class in the SOM object environment;

the INPUTAMPPING statement establishing a relationship between container fields and parameters of the related object methods;

the USEREXCEPTION statement establishing relationship between an exception in the SOM object environment and the return codes within the process environment;

the various PROGRAM_ACTIVITY statements establishing relationships between a process model within the process environment and an related object class and its implementing related object method.

For instance PROGRAM_ACTIVITY 'DepositAccount' relates the process activity DepositAccount with the related object method deposit of the related SOM class Account.

The SOM Class 'Account'

FIG. 20 shows the generated SOM class structures as an implementation of the process model in the SOM object environment generated according to the teaching of the invention.

The SOM class generated according to the teaching is the class account. Specific attention should also be given to the generated related object methods printErrorStatement, printStatement, deposit and withdraw. The two attributes are defined in the implementation section, so that no get and set methods are created.

Class Extensions

FIG. 21 reflects the class extensions of the dataItem class, which support the process of copying the values of fields of the containers to the parameters of the object methods. This function is achieved by the method create Value.

The method parameters are allocated as program variables. The new method createValue for the dataItem classes is used to copy the value of a dataItem instance into a parameter. If the dataItem instance has no value, NULL is assigned for a STRING variable, zero for a FLOAT or LONG variable.

Generated Invocation Context

FIG. 22 illustrates the code generated according to the teaching of the invention which calls from within the FLOWMARK process environment a related object method of a related class implementing the activity of the example in the SOM object environment. This code sequence assembles an invocation context for the invocation of the related object method. FIG. 22 shows the code generated for the WithdrawAccount activity of the process model.

With respect to FIG. 22 attention should be given to the following features:

Statements {01} to {04} include operating system specific and library header files.

Statement {05} includes the header file for the account class.

Statements {06} and {07} include the header files for the activity and the data item class.

Statement {11} defines a pointer to the SOM environment structure which is obtained by invoking somGetGlobalEnvironment.

Statement {12} defines a pointer to the SOM exception identifier.

Statements {13}, {14} and {15} define constants used to set the return code field _RC of the activity.

Statements {15} through {21} declare the program variables used as method parameters. One variable is allocated for each parameter in each method. Allocation of values is performed via the create Value method of the data item classes.

Statement {22} is the declaration for the defined SOM exception badCall.

Statements {33} and {34} copy the values of the corresponding input container fields to the program variables for the method parameters.

Statement {35} creates the object as the object has not been created earlier. Since no object identifier was given for the program activity, the process-wide global object identifier for the SOM class is used.

Statement {36} is the invocation of the method against the SOM object.

Statement {37} checks for the type of exception returned by the method. It is found in the _major field of the environment structure.

Statement {38} is true if the return code indicates a system exception as documented in the SOM user's guide.

In this case, statement {39} sets the return code to the user-specified default system exception, statement {40} frees the buffer allocated by SOM for communicating the error, and statement {41} forces the termination of the switch statement.

Statement {42} is true if the return code indicates a user exception, i.e. an exception which has been defined by the definer of the class. In this case, tests must be made for checking which conditions have been raised.

Statement {43} addresses the SOM exception identifier.

Statement {44} determines if the exception identifier is equal to the defined one, which is badCall.

If true, statement {45} address the structure as defined by the exception.

Statement {46} then copies the value of the field which has been determined to hold the return code, to the return code variable.

Statement {47} frees the buffer allocated for returning the error information, and statement {48} terminates the error processing.

Statement {50} determines if the insufficientFunds exception has been returned.

As the exception neither contains a field nor a mapping has been specified for it, statement {51} sets the return code to the user-defined default user exception return code.

Statement {54} determines if the invalidAccount exception has been returned. In this case, as a mapping has been defined for the exception, statement {55} sets the return code to the specified value.

Statement {58} is true if the method call was executed without any error. In this case, statement {59} sets the _RC to zero, and statement {60} terminates error processing.

Statements {61} and {62} delete the program variables. STRING type variables are deleted, FLOAT and LONG type variables are set to zero.

As shown above, there has been disclosed an invention which may be practiced in a method, in a computer system, and in a program product. The invention, generally speaking, involves the improved linking of the workflow process environment and the object environment. The workflow process environment has a process model that defines a process activity. The process activity ultimately is managed and executed by a computer system. The process model has specifications. These specifications are extended by relating the model to a related object class that can be used to implement the process activity defined by the model. Particular methods of the related object are related to the model so as actually to perform the process activity. In the invention, these relationships are stored among the specifications of the process model.

Generally speaking, there has been disclosed also an automated method of generating an implementation of the process model. That is, the specifications of the process model are detected. Depending on what particular specification is detected (i.e., the detected specification), there may be generated an object class, a method of the object class, etc. This automatic generation, which may be realized in a method, a computer system, or in a program product, also may automatically generate input and output variables. The automatic generation provides for an invocation context that may be used to invoke the method of an object instantiated from the generated object class.

As will be appreciated, the above exemplary embodiments of the invention contain many specificities and details relating to the particular, presently preferred context in which the invention has been described. These details should not be understood to be limiting with respect to the scope of the invention. Rather, the scope of the invention should be determined with respect to the below claims.

We claim:

1. A method of extending of the specifications of a process model within a workflow process environment, said process model defining a process activity managed and executed by a computer system, said method comprising:

linking said process model with an object environment within which said process activity is to be implemented;

relating said process model to a related object class residing within said object environment to define a related object class specification, said related object class implementing said process activity;

storing said related object class specification in said process model;

relating said process model to a related object method of said related object class to define a related object method specification, said related object method implementing said process activity; and storing said related object method specification in said process model.

2. The method of extending according to claim 1, wherein:

said process model comprises at least one of an input container and an output container;

when said process model comprises said input container, said method further comprises:

relating a field of said input container to an input parameter of said related object method to define an input container relation specification, and storing said input container relation specification in said process model;

when said process model comprises said output container, said method further comprises:

relating a field of said output container to an output parameter of said related object method to define an output container relation specification, and storing output container relation specification in said process model.

3. The method of extending according to claim 2, further comprising:

an exception relation step of relating an exception of said related object method to a return code field of said process model to define an exception relation specification; and storing said exception relation specification in said process model.

4. The method of extending according to claim 3, wherein said exception relation step relates an exception variable storing said exception to said return code field.

5. The method of extending according to claim 3, wherein said exception relation step relates an exception value of said exception to said return code field.

6. The method of extending according to claim 1, further comprising:

an exception relation step of relating an exception of said related object method to a return code field of said process model to define an exception relation specification; and storing said exception relation specification in said process model.

7. The method of extending according to claim 6, wherein said exception relation step relates an exception variable storing said exception to said return code field.

8. The method of extending according to claim 6, wherein said exception relation step relates an exception value of said exception to said return code field.

9. A computer system, comprising:

a memory with computer readable instructions, and one or more processors for executing said computer readable instructions;

said computer system supporting a workflow process environment and an object environment;

said workflow process environment including process model specifications of a process model that defines a process activity managed and executed by said computer system;

said computer readable instructions causing said one or more processors to perform:

linking said process model with said object environment within which said process activity is to be implemented;

relating said process model to a related object class residing within said object environment to define a related object class specification, said related object class implementing said process activity;

storing said related object class specification in said process model;

relating said process model to a related object method of said related object class to define a related object method specification, said related object method implementing said process activity; and storing said related object method specification in said process model.

10. The computer system according to claim 9, wherein:

said process model comprises at least one of an input container and an output container;

when said process model comprises said input container, said computer readable instructions cause said one or more processors to perform:

relating a field of said input container to an input parameter of said related object method to define an input container relation specification, and storing said input container relation specification in said process model;

when said process model comprises said output container, said computer readable instructions cause said one or more processors to perform:

relating a field of said output container to an output parameter of said related object method to define an output container relation specification, and storing said output container relation specification in said process model.

11. The computer system according to claim 10, wherein said computer readable instructions cause said one or more processors to perform:
   an exception relation step of relating an exception of said related object method to a return code field of said process model to define an exception relation specification; and
   storing said exception relation specification in said process model.

12. The computer system according to claim 11, wherein said exception relation step relates an exception variable storing said exception to said return code field.

13. The computer system according to claim 11, wherein said exception relation step relates an exception value of said exception to said return code field.

14. The computer system according to claim 9, wherein said computer readable instructions cause said one or more processors to perform:
   an exception relation step of relating an exception of said related object method to a return code field of said process model to define an exception relation specification; and
   storing said exception relation specification in said process model.

15. The computer system according to claim 14, wherein said exception relation step relates an exception variable storing said exception to said return code field.

16. The computer system according to claim 14, wherein said exception relation step relates an exception value of said exception to said return code field.

17. A computer program product, comprising:
   a computer readable medium bearing computer-readable instructions for causing one or more processors of a computer system, which supports a workflow process environment and an object environment, to perform:
      linking a process model of said workflow process environment, said process model defining a process activity to be managed and executed by said computer system, with said object environment within which said process activity is to be implemented;
      relating said process model to a related object class residing within said object environment to define a related object class specification, said related object class implementing said process activity;
      storing said related object class specification in said process model;
      relating said process model to a related object method of said related object class to define a related object method specification, said related object method implementing said process activity; and
      storing said related object method specification in said process model.

18. The computer program product according to claim 17, wherein:
   when said process model comprises said input container, said computer-readable instructions cause said one or more processors to perform:
      relating a field of said input container to an input parameter of said related object method to define an input container relation specification, and
      storing said input container relation specification in said process model;
   when said process model comprises said output container, said computer-readable instructions cause said one or more processors to perform:
      relating a field of said output container to an output parameter of said related object method to define an output container relation specification, and
      storing said output container relation specification in said process model.

19. The computer program product according to claim 18, wherein said computer-readable instructions cause said one or more processors to perform:
   an exception relation step of relating an exception of said related object method to a return code field of said process model to define an exception relation specification; and
   storing said exception relation specification in said process model.

20. The computer program product according to claim 19, wherein said exception relation step relates an exception variable storing said exception to said return code field.

21. The computer program product according to claim 19, wherein said exception relation step relates an exception value of said exception to said return code field.

22. The computer program product according to claim 17, wherein said computer-readable instructions cause said one or more processors to perform:
   an exception relation step of relating an exception of said related object method to a return code field of said process model to define an exception relation specification; and
   storing said exception relation specification in said process model.

23. The computer program product according to claim 22, wherein said exception relation step relates an exception variable storing said exception to said return code field.

24. The computer program product according to claim 22, wherein said exception relation step relates an exception value of said exception to said return code field.

25. A computerized method of automatically generating an implementation of a process model managed and executed by a computer system using specifications of a process model residing in a workflow process environment, said implementation of said process model being generated as object structures residing within an object environment, said method comprising:
   detecting said specifications of said process model to provide at least one detected specification;
   generating, in response to said detected specification being a related object class specification, a related object class as an implementing class within said object environment;
   generating, in response to said detected specification being a related object method specification, a related object method as an implementing object method of said related object class;
   generating an invocation context to invoke said related object method from said workflow process environment; and
   executing said related object method within said object environment.

26. The method of generating according to claim 25, further comprising:
   generating, in response to said detected specification being an input container relation specification having one or more input parameters, an input variable for each of said one or more input parameters; and
   generating, in response to said detected specification being an output container relation specification having one or more output parameters, an output variable for each of said one or more output parameters.

27. The method of generating according to claim 26, further comprising:

generating, in response to said detected specification being said input container relation specification, an input parameter set-up sequence, within said invocation context, for writing each input container field value to a respective said input variable in accordance with said input container relation specification;

generating, in response to said detected specification being said related object class specification, an object instantiation sequence, within said invocation context, for instantiating a related object instance of said related object class;

generating a related object method invocation sequence, within said invocation context, for invoking said related object method with said input variable and said output variable;

generating, in response to said detected specification being an exception relation specification, an exception handling sequence, within said invocation context, for checking whether execution of said related object method raises an exception, such that when said exception is identifiable said exception handling sequence causes said exception to be written to a return code field of said process model;

generating, in response to said detected specification being said output container relation specification, an output parameter set-up sequence, within said invocation context, for writing a respective value of each said output variable to a respective output container field in accordance with said output container relation specification.

28. The method of generating according to claim 27, further comprising generating an I/O variable deletion sequence, within said invocation context, for deleting at least one of said input variable and said output variable.

29. A computer system, comprising:

a memory with computer readable instructions, and one or more processors for executing said computer readable instructions;

said computer system supporting a workflow process environment and an object environment, said workflow process environment including process model specifications of a process model that defines a process activity managed and executed by said computer system, said computer readable instructions causing said one or more processors to automatically generate an implementation of said process model using said process model specifications, said implementation of said process model being generated as object structures residing within said object environment;

wherein said automatic generation comprises:

detecting said specifications of said process model to provide at least one detected specification;

generating, in response to said detected specification being a related object class specification, a related object class as an implementing class within said object environment;

generating, in response to said detected specification being a related object method specification, a related object method as an implementing object method of said related object class;

generating an invocation context to invoke said related object method from said workflow process environment; and executing said related object method within said object environment.

30. The computer system according to claim 29, wherein said automatic generation further comprises:

generating, in response to said detected specification being an input container relation specification having one or more input parameters, an input variable for each of said one or more input parameters; and generating, in response to said detected specification being an output container relation specification having one or more output parameters, an output variable for each of said one or more output parameters.

31. The computer system according to claim 30, wherein said automatic generation further comprises:

generating, in response to said detected specification being said input container relation specification, an input parameter set-up sequence, within said invocation context, for writing each input container field value to a respective said input variable in accordance with said input container relation specification;

generating, in response to said detected specification being said related object class specification, an object instantiation sequence, within said invocation context, for instantiating a related object instance of said related object class;

generating a related object method invocation sequence, within said invocation context, for invoking said related object method with said input variable and said output variable;

generating, in response to said detected specification being an exception relation specification, an exception handling sequence, within said invocation context, for checking whether execution of said related object method raises an exception, such that when said exception is identifiable said exception handling sequence causes said exception to be written to a return code field of said process model;

generating, in response to said detected specification being said output container relation specification, an output parameter set-up sequence, within said invocation context, for writing a respective value of each said output variable to a respective output container field in accordance with said output container relation specification.

32. The computer system according to claim 31, wherein said automatic generation further comprises generating an I/O variable deletion sequence, within said invocation context, for deleting at least one of said input variable and said output variable.

33. A computer program product, comprising:

a computer readable medium bearing computer-readable instructions for causing one or more processors of a computer system, which supports a workflow process environment and an object environment;

wherein said workflow process environment includes process model specifications of a process model that defines a process activity managed and executed by said computer system;

wherein said computer readable instructions cause said one or more processors to automatically generate an implementation of said process model using said process model specifications, said implementation of said process model being generated as object structures residing within said object environment;

wherein said automatic generation comprises:
- detecting said specifications of said process model to provide at least one detected specification;
- generating, in response to said detected specification being a related object class specification, a related object class as an implementing class within said object environment;
- generating, in response to said detected specification being a related object method specification, a related object method as an implementing object method of said related object class;
- generating an invocation context to invoke said related object method from said workflow process environment; and
- executing said related object method within said object environment.

34. The computer program product according to claim 33, wherein said automatic generation further comprises:
- generating, in response to said detected specification being an input container relation specification having one or more input parameters, an input variable for each of said one or more input parameters; and
- generating, in response to said detected specification being an output container relation specification having one or more output parameters, an output variable for each of said one or more output parameters.

35. The computer program product according to claim 34, wherein said automatic generation further comprises:
- generating, in response to said detected specification being said input container relation specification, an input parameter set-up sequence, within said invocation context, for writing each input container field value to a respective said input variable in accordance with said input container relation specification;
- generating, in response to said detected specification being said related object class specification, an object instantiation sequence, within said invocation context, for instantiating a related object instance of said related object class;
- generating a related object method invocation sequence, within said invocation context, for invoking said related object method with said input variable and said output variable;
- generating, in response to said detected specification being an exception relation specification, an exception handling sequence, within said invocation context, for checking whether execution of said related object method raises an exception, such that when said exception is identifiable said exception handling sequence causes said exception to be written to a return code field of said process model;
- generating, in response to said detected specification being said output container relation specification, an output parameter set-up sequence, within said invocation context, for writing a respective value of each said output variable to a respective output container field in accordance with said output container relation specification.

36. The computer program product according to claim 35, wherein said automatic generation further comprises generating an I/O variable deletion sequence, within said invocation context, for deleting at least one of said input variable and said output variable.

* * * * *